United States Patent
Mizuno

(10) Patent No.: US 10,321,001 B2
(45) Date of Patent: Jun. 11, 2019

(54) IMAGE PROCESSING APPARATUS, METHOD FOR CONTROLLING IMAGE PROCESSING APPARATUS, AND STORAGE MEDIUM

(71) Applicant: CANON KABUSHIKI KAISHA, Tokyo (JP)

(72) Inventor: Yoshitake Mizuno, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/792,346

(22) Filed: Jul. 6, 2015

(65) Prior Publication Data

US 2016/0014290 A1    Jan. 14, 2016

(30) Foreign Application Priority Data

Jul. 8, 2014   (JP) ................................. 2014-140136

(51) Int. Cl.
*H04N 1/387*   (2006.01)
*H04N 1/00*    (2006.01)
(Continued)

(52) U.S. Cl.
CPC ..... *H04N 1/00779* (2013.01); *H04N 1/00708* (2013.01); *H04N 1/00864* (2013.01); *H04N 1/3875* (2013.01); *G03G 15/607* (2013.01)

(58) Field of Classification Search
CPC ............ B65H 2220/01; B65H 2511/12; B65H 2511/414; B65H 2513/512; B65H 2220/02; B65H 2301/13; B65H 7/20; H04N 1/00567; H04N 1/588; H04N 1/602; H04N 1/0062; H04N 1/00681; H04N 1/0071;
(Continued)

(56) References Cited

U.S. PATENT DOCUMENTS

| 4,920,384 A | * | 4/1990 | Okamoto | ........... G03G 15/5095 399/370 |
| 5,946,527 A | * | 8/1999 | Salgado | .................. B65H 1/04 271/3.01 |

(Continued)

FOREIGN PATENT DOCUMENTS

| JP | H11-146127 A | 5/1999 |
| JP | 2001188443 A | 7/2001 |

(Continued)

*Primary Examiner* — Chad Dickerson
(74) *Attorney, Agent, or Firm* — Canon U.S.A., Inc. IP Division

(57) ABSTRACT

An image processing apparatus includes first and second detecting units, a conveying unit, a reading unit, a setting unit, an executing unit, a storing unit, and a correcting unit. The first detecting unit detects a size of a set document. The conveying unit conveys the set document. The second detecting unit detects a size of the conveyed document. The reading unit reads an image of the conveyed document and generates image data. The setting unit sets a setting value based on the detected size before the document image is read. The executing unit executes image processing on the image data, based on the set setting value. The storing unit stores the image data. The correcting unit corrects, where the size detected by the second detecting does not match the size detected by the first detecting, the stored image data based on the size detected by the second detecting unit.

8 Claims, 9 Drawing Sheets

(51) Int. Cl.
*H04N 1/40* (2006.01)
*G06F 3/12* (2006.01)
*G03G 15/00* (2006.01)

(58) Field of Classification Search
CPC ............ H04N 1/00734; H04N 1/0075; H04N 1/00755; H04N 1/00774; H04N 1/00915; H04N 1/00708; H04N 1/00779; H04N 1/3877; H04N 1/393; G03G 15/5095; G03G 15/607; G03G 2215/00185
USPC ....... 358/1.11–1.18, 474, 498, 497; 399/371, 399/370, 86, 374, 45; 271/265.02, 245
See application file for complete search history.

(56) References Cited

U.S. PATENT DOCUMENTS

| | | | | |
|---|---|---|---|---|
| 6,028,968 A * | 2/2000 | Kurita | ................ | H04N 1/00681 358/449 |
| 6,118,972 A * | 9/2000 | Yamazaki | ............ | G03G 15/607 399/370 |
| 2004/0125394 A1* | 7/2004 | Terao | ..................... | B41J 11/003 358/1.13 |
| 2004/0190927 A1* | 9/2004 | Tsukamoto | ........ | G03G 15/5095 399/82 |
| 2006/0279812 A1* | 12/2006 | Shiba | ................ | G03G 15/5095 358/532 |
| 2009/0073512 A1* | 3/2009 | Kobayashi | ............... | B65H 7/20 358/498 |
| 2012/0081759 A1* | 4/2012 | Itoh | .................... | H04N 1/00588 358/449 |

FOREIGN PATENT DOCUMENTS

| | | |
|---|---|---|
| JP | 2005176025 A | 6/2005 |
| JP | 2006-074124 A | 3/2006 |
| JP | 2008042420 A | 2/2008 |
| JP | 2009-67559 A | 4/2009 |
| JP | 2013232745 A | 11/2013 |

* cited by examiner

FIG.5

| ON/OFF OF EACH TRAY SENSOR | A3 | B4 | A4R | B5R | A4 | B5 | A5R | B5R | A5 | B6 |
|---|---|---|---|---|---|---|---|---|---|---|
| TRAY SENSOR 10 | ON | ON | OFF | OFF | OFF | OFF | OFF | OFF | OFF | OFF |
| TRAY SENSOR 11 | ON | ON | ON | ON | OFF | OFF | OFF | OFF | OFF | OFF |

| ON/OFF OF EACH TRAY SENSOR | LDR | LGL | LTRR | LTR | STMT | STMTR |
|---|---|---|---|---|---|---|
| TRAY SENSOR 10 | ON | ON | OFF | OFF | OFF | OFF |
| TRAY SENSOR 11 | ON | ON | ON | OFF | OFF | OFF |

FIG.7
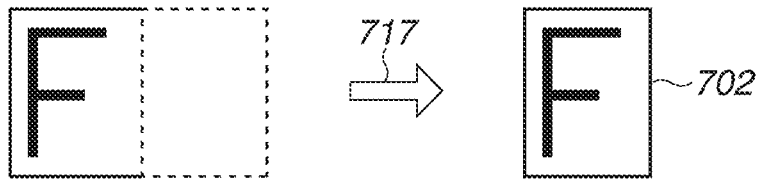
701 — HDD STORAGE TIMING
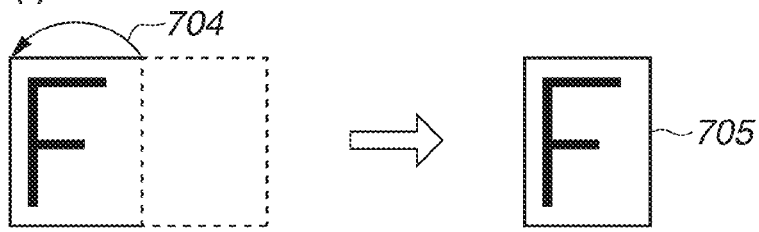
703 — (1) DIRECT PRINT ON A4 PAPER
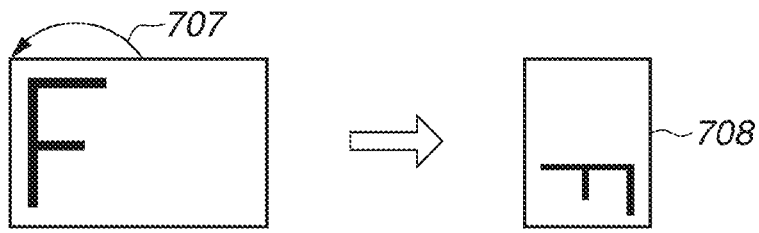
706 — (2) (AUTOMATIC PAPER SELECTION FUNCTION) 70% MAGNIFICATION DESIGNATION
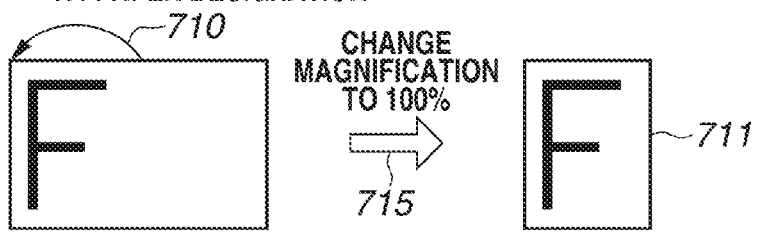
709 — (3) (AUTOMATIC MAGNIFICATION SELECTION FUNCTION) A4 PAPER DESIGNATION
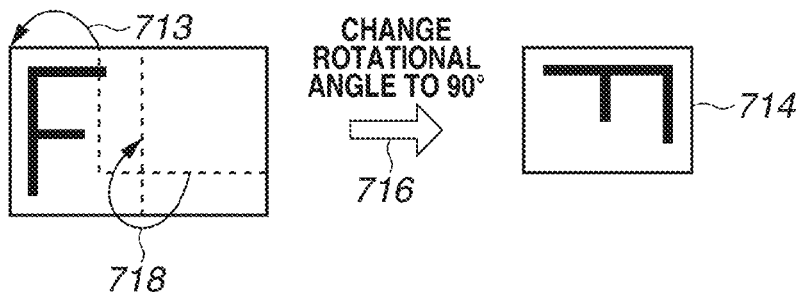
712 — (4) (AUTO VERTICAL/HORIZONTAL ROTATION FUNCTION) A4R PAPER DESIGNATION

IMAGE PROCESSING APPARATUS, METHOD FOR CONTROLLING IMAGE PROCESSING APPARATUS, AND STORAGE MEDIUM

BACKGROUND OF THE INVENTION

Field of the Invention

The present invention relates to an image processing apparatus capable of conveying and reading a document, a method for controlling the image processing apparatus, and a storage medium.

Description of the Related Art

An image processing apparatus, such as a copying machine or a facsimile apparatus, is equipped with an image reading device. Further, among various image reading devices, there is an image reading device that is equipped with an automatic document feeder (ADF).

In many cases, the image processing apparatus has functions each requiring detecting a document size before starting a document image reading operation. The function requiring detecting the document size before starting the image reading operation is, for example, an automatic paper selection function or an automatic magnification selection function.

The automatic paper selection function is a function of automatically selecting a paper having an appropriate size based on a document size, a designated magnification, and required image rotation processing. Further, the automatic magnification selection function is a function of calculating an image magnification required to enlarge or reduce a read document image according to a designated paper size and automatically setting the calculated image magnification. The above-mentioned functions (i.e., the automatic paper selection function and the automatic magnification selection function) can be realized by a controller provided in the image processing apparatus.

Further, as a document image reading mode using the ADF, a same width mixed document reading mode or a different width mixed document reading mode becomes important to cause the image processing apparatus to read a document bundle composed of a plurality of document sheets that are different in size. Even when the image processing apparatus performs a document image reading operation according to either the same width or the different width mixed document reading mode, a user requires that the reading efficiency is maintained at a high level.

When the image processing apparatus processes documents without setting the same width or the different width mixed document reading mode, the image processing apparatus regards the documents as being identical in size. Therefore, a fixed document size can be identified based on document width information obtainable when the document is set on a document tray of the ADF or document length information obtainable when the document is initially conveyed in the feeding direction.

As one type of the ADF, the apparatus can be configured to have a large scale to provide a conveying path that is sufficiently long. According to the ADF having such a large-scale configuration, it is feasible to determine the document width information and the document length information before a leading edge of each document reaches a document reading position. On the other hand, in many cases, the large-scale ADF is heavy and expensive because the entire configuration of the apparatus tends to be excessively large.

On the other hand, as another type of the ADF, the apparatus can be configured to have a document conveying path that is comparatively short. For example, the ADF can be designed to set a conveying path length (i.e., the length from a paper feeding position of a document placed on the document tray to the document reading position) to be shorter than the length of an A4-size document (i.e., document width 297 mm×document length 210 mm) that is generally used by many users. Such an ADF is advantageous in that the entire configuration is compact. In a case where the above-mentioned compact ADF performs an ordinary reading operation for reading a document bundle composed of a plurality of document sheets that are identical in document size, the ADF determines the length of the documents set on the document tray, by using a sensor provided in the document tray to identify the document size based on the document width information and the document length information.

However, the above-mentioned ADF has the following problem because the document conveying path is comparatively short. A control differentiated from the ordinary reading operation is required in a case where the ADF realizes the automatic paper selection function and the automatic magnification selection function when the ADF reads each sheet of a document bundle composed of a plurality of document sheets that are mutually different in document size in the different width mixed document reading mode in which the ADF reads each document while automatically identifying the size thereof. According to the above-mentioned ADF, both of the width and the length of each sheet are unknown in a state where only a target document is set on the document tray. Therefore, identifying the document size before starting a document reading operation is unfeasible.

Therefore, the above-mentioned ADF identifies the size of each document by detecting the width of the document or the length of the document in the document conveying direction while the document is conveyed along a reversing conveying path (i.e., a circulative path) that is used for reversing the document when the ADF reads images formed on both sides of the document. Even in the same width mixed document reading mode, a similar problem arises because the length of each sheet in the document conveying direction is unknown in a state where only a target document is set on the document tray.

Accordingly, when the ADF performs a reading operation according to the same width or the different width mixed document reading mode, the ADF performs hollow reversing processing in such a way as to convey a target document along a circulative path to identify the document size for each page. Therefore, the same width/the different width mixed document reading mode is inferior to the ordinary (or standard) size document reading mode in that the reading efficiency deteriorates.

Further, as a technique capable of solving the above-mentioned reduction in reading efficiency, among ADFs, there is an ADF configured to predict a document size so as to avoid performing the above-mentioned hollow reversing processing as much as possible.

As discussed in Japanese Patent Application Laid-Open No. 2006-074124, in a case where the document size is unknown in the same width/the different width mixed document reading mode, it is conventionally known to extract a plurality of candidates of the document size based on a detected width and then determine one of the candidates as a provisional document size. However, in a case where neither the same width nor the different width mixed document reading mode is set, if the documents being stacked are mixed in size or if something other than a target document to be read (e.g., other document bundle) is placed on a sensor provided on the document tray, the document size may be erroneously detected and a miscopy may occur.

For example, as mentioned above, if the document size is erroneously detected as A3 even though the document being actually set on the ADF is A4, the result obtainable through a reading operation is an A3 size image. In this case, the obtained A3 size image is constituted by a document image positioned on one side (corresponding to an A4 size area) and a blank image positioned on the other side (corresponding to the remaining A4 size area). For example, if the blank image portion of the above-mentioned A3 size image is printed on an A4 paper, the print result will be regarded as a miscopy. On the other hand, according to the mixed document reading mode, the above-mentioned miscopy does not occur because the size of each document is determined after the document is pulled in the ADF.

Further, as discussed in Japanese Patent Application Laid-Open No. 2009-67559, a technique capable of solving the above-mentioned problem is conventionally known. More specifically, in a case where the mixed document reading mode is not set, it is conventionally known to prevent the occurrence of miscopy by interrupting a document conveying operation when documents being conveyed are mutually different in width.

The technique discussed in Japanese Patent Application Laid-Open No. 2006-074124 requires a user to perform a mixed document designation setting. Further, if the document size prediction is failed in the document size detection, it is required to perform a reading operation again through the document hollow rotation processing. It takes a significant time to complete the document reading operation including the hollow rotation processing. Further, the document size determination is feasible only after the document is pulled in the ADF. Therefore, the timing to start the latter processing (e.g., print) is delayed. As a result, the reading efficiency deteriorates significantly.

Further, according to the technique discussed in Japanese Patent Application Laid-Open No. 2009-67559, the reading efficiency deteriorates similarly because interrupting the document reading operation is necessary to prevent the occurrence of miscopy.

SUMMARY OF THE INVENTION

According to an aspect of the present invention, an image processing apparatus includes a first detecting unit configured to detect a size of a document set on a document stacking portion, a conveying unit configured to convey the document set on the document stacking portion, a second detecting unit configured to detect a size of the document being conveyed by the conveying unit, a reading unit configured to read an image of the document being conveyed by the conveying unit and generate image data, a setting unit configured to set a setting value based on the size detected by the first detecting unit before the image of the document is read by the reading unit, an executing unit configured to execute image processing on the image data generated by the reading unit, based on the setting value set by the setting unit, a storing unit configured to store the image data on which the image processing has been executed by the executing unit, and a correcting unit configured to correct, in a case where the size detected by the second detecting unit does not match the size detected by the first detecting unit, the image data stored in the storing unit based on the size detected by the second detecting unit.

Further features of the present invention will become apparent from the following description of exemplary embodiments with reference to the attached drawings.

BRIEF DESCRIPTION OF THE DRAWINGS

FIG. 5 illustrates tables each indicating a relationship between document sizes and corresponding sensor ON/OFF states.

FIG. 7 illustrates various methods for outputting an image after correcting latter processing in response to an error in document size detection.

DESCRIPTION OF THE EMBODIMENTS

Exemplary embodiments of the present invention will be described in detail below with reference to attached drawings.

Figure 1:
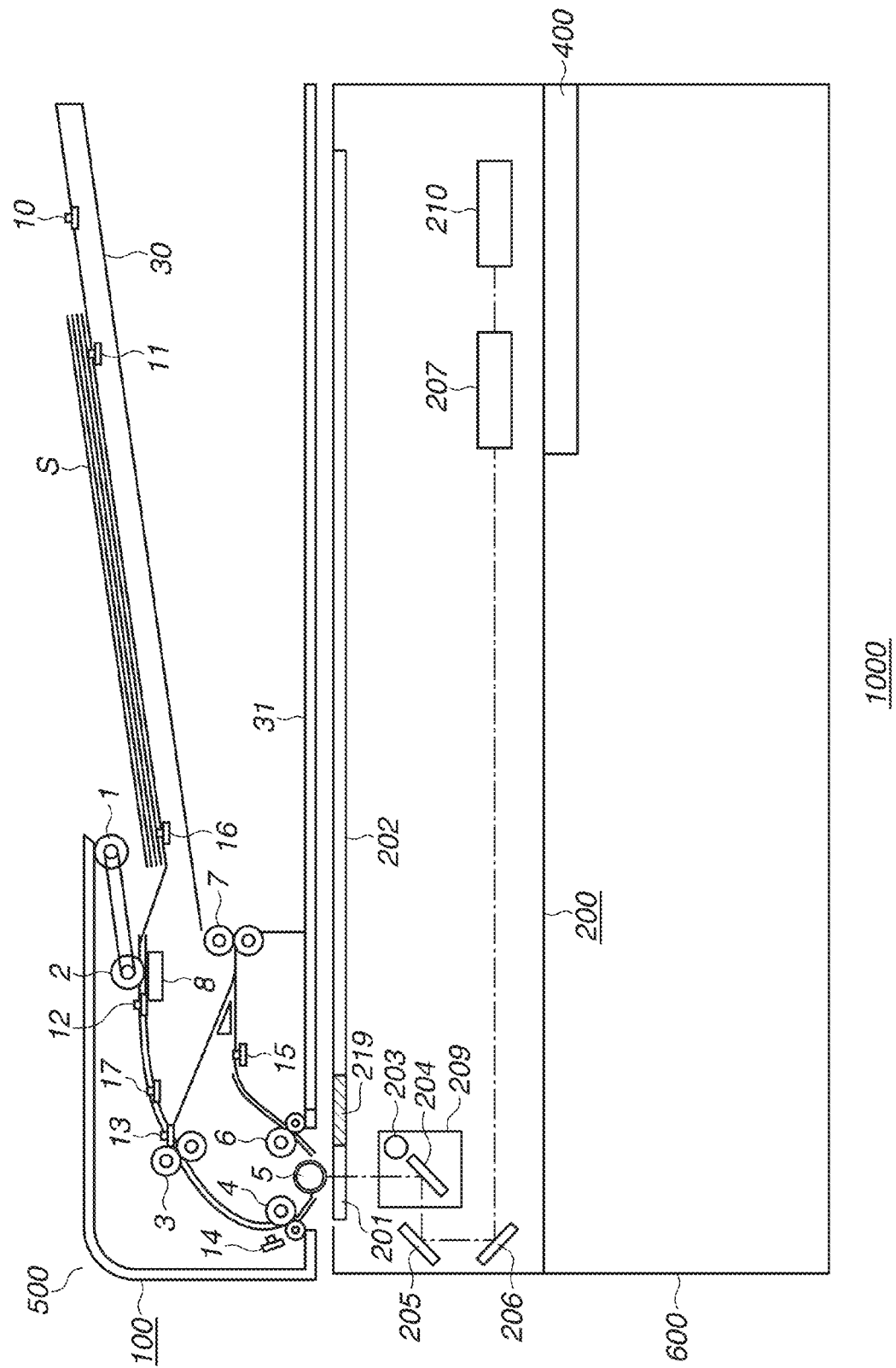
FIG. 1 is a cross-sectional view illustrating a configuration example of an image processing apparatus according to the present exemplary embodiment.

FIG. 1 is a cross-sectional view illustrating a configuration example of an image processing apparatus according to an exemplary embodiment of the present invention.

An image processing apparatus 1000 according to a first exemplary embodiment includes a document reading apparatus 500 and an image output apparatus 600. The document reading apparatus 500 includes an image reading device (i.e., a reader) 200, an automatic document feeder (ADF) 100, and a controller unit 400.

FIG. 1 illustrates a state of the image processing apparatus 1000 immediately after a document bundle S of a plurality of document sheets is stacked on a document tray 30. The document tray 30 is a stacking portion on which at least one document can be stacked. The ADF 100 according to the present exemplary embodiment has a relatively short document conveying path. In other words, according to the ADF illustrated in FIG. 1, a conveyance distance from a post-separation sensor 12 to the document reading position is shorter than a predetermined distance. More specifically, the above-mentioned conveyance distance is shorter than the length (210 mm) of a shorter side of A4-size document (210×297) that is mainly used. The above-mentioned conveyance distance is a distance that is insufficient to measure the length of the document in the document feeding direction based on clock counting measurement of a conveying motor in a document conveying operation before the document reaches the document reading position.

A document image reading operation using the above-mentioned ADF 100 will be described in detail below.

When the ADF 100 starts a document image reading job, an optical scanner unit 209 moves to a position immediately beneath a reference white plate 219 and performs a shading operation. After completing the shading operation, the optical scanner unit 209 further moves until it reaches a position immediately beneath a document feeding-reading platen glass 201 and waits for a while until the document reaches the document reading position.

First, after the ADF 100 starts the job, a paper feeding roller 1 falls on a surface of the uppermost document constituting the document bundle S and starts rotating. The uppermost document can be thereby separated from the document bundle S and can be conveyed toward the document reading position.

When the ADF 100 successively feeds and conveys the uppermost document from the document bundle S stacked on the document tray 30, a separation roller 2, a separation pad 8, and the paper feeding roller 1 cooperatively perform a paper feeding and conveying operation in such a way as to prevent a document following the uppermost document from being overlapped with and conveyed together with the uppermost document. The document having been fed and conveyed by the paper feeding roller 1 can be separated as a single sheet by the function of the separation roller 2 and the separation pad 8. The above-mentioned separation can be realized by a conventionally known separation technique.

The document separated by the separation roller 2 and the separation pad 8 is then conveyed toward registration rollers 3 until the document abuts the registration rollers 3. The above-mentioned operation prevents a loop from being undesirably formed at a leading edge of the document and prevents the document from skewing during the conveying operation. A registration sensor 13 detects the document. A document pre-reading roller 4 is provided on the downstream side of the registration rollers 3. The document pre-reading roller 4 can convey the document toward the document feeding-reading platen glass 201 along a paper feeding path disposed on a downstream side thereof.

The document guided into the paper feeding path is conveyed toward the document pre-reading roller 4 by the registration rollers 3. Further, the above-mentioned document is further conveyed in such a way as to pass the document pre-reading roller 4 and subsequently pass the document reading position on the document feeding-reading platen glass 201 located in the vicinity of a document reading platen roller 5.

When the document is conveyed toward the document reading position on the document feeding-reading platen glass 201, a lead sensor 14 detects a leading edge of the document to detect the leading edge position of the document reading. The ADF 100 counts the time required for the document to reach the document reading position on the document feeding-reading platen glass 201 from the ON timing of the lead sensor 14, based on a clock of a conveying motor (not illustrated) that serves as a driving source for the document pre-reading roller 4 and the document reading platen roller 5.

As mentioned above, the ADF 100 predicts the time when the leading edge of each document reaches the document reading position on the document feeding-reading platen glass 201. At the above-mentioned predicted document leading edge reach timing, the optical scanner unit 209 performs an operation for acquiring a feeding-reading image along a surface of the document.

When the post-separation sensor 12 detects a trailing edge of the document, a document presence/absence detecting sensor 16 detects the presence/absence of the next document set on the document tray 30. If the trailing edge of the document is further conveyed after passing the document reading platen roller 5 and a roller 6, a paper discharge sensor 15 detects the trailing edge of the document. Triggered by the document trailing edge detecting timing of the above-mentioned paper discharge sensor 15, a document reading and conveying sequence for one side of a single document terminates when the document is discharged from a paper discharge roller 7 to a document discharge tray 31.

The ADF 100 can actually measure the length of each document in the feeding direction by counting the time required for the post-separation sensor 12 to detect the trailing edge of the document since the ON timing of the lead sensor 14 based on the clock of the conveying motor serving as the driving source for the document pre-reading roller 4. The above-mentioned method for actually measuring the length of the document in the feeding direction is a mere example. Any other method is employable. As mentioned above, according to the present exemplary embodiment, the document conveying path of the ADF 100 is relatively short. Therefore, it is unfeasible to determine the length of the document in the feeding direction before the document reaches the document reading position.

The ADF 100 basically repeats the above-mentioned operations (i.e., the document feeding operation, the document image acquiring operation, and the document discharge operation) until all of the stacked documents are completely fed from the document tray 30, except in the case that the job setting preliminarily designates reading a predetermined number of sheets. When the trailing edge of the document is detected by the post-separation sensor 12, in a case where no document is detected, the ADF 100 identifies a document being currently conveyed as the final document. Then, the ADF 100 waits for a while until the final document is completely discharged to the document discharge tray 31. Then, after the final document has been completely discharged to the document discharge tray 31, the ADF 100 stops the conveying motor serving as the driving source of each roller and returns the paper feeding roller 1 to the original position. The ADF 100 terminates the document image reading job.

The ADF 100 according to the present exemplary embodiment performs a document size detecting operation to identify one of regular sizes (e.g., AB standard sizes or inch standard sizes).

Various sensors disposed on the document tray 30 will be described in detail below with reference to FIGS. 2 and 3.

Figure 2:
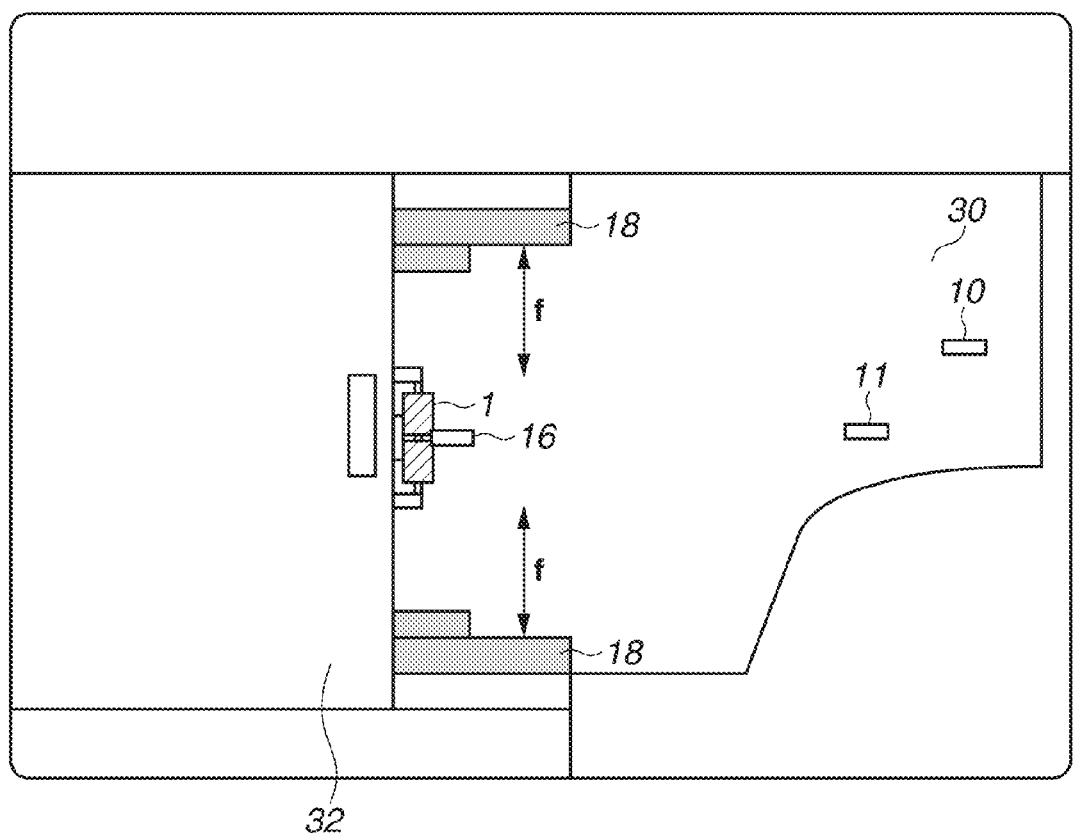
FIG. 2 illustrates examples of various sensors disposed in a document tray.
Figure 3:
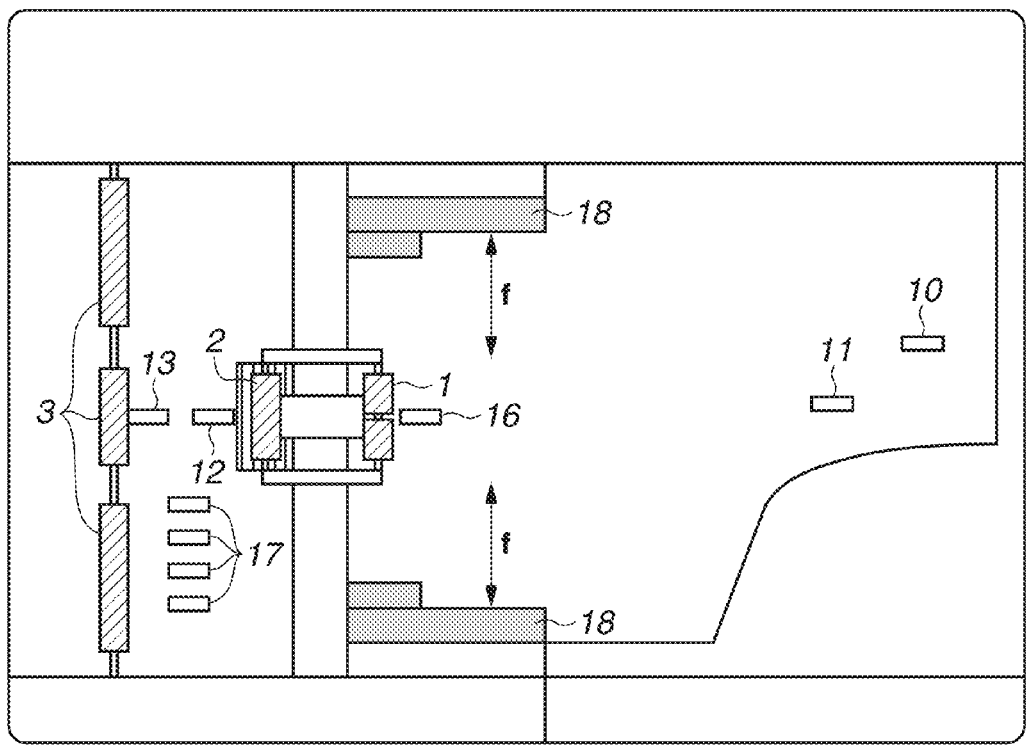
FIG. 3 illustrates examples of various sensors disposed in the document tray.

FIGS. 2 and 3 illustrate various sensors disposed on the document tray 30.

More specifically, FIG. 2 illustrates the ADF 100 in a state where a conveyance cover 32 is attached. FIG. 3 illustrates the ADF 100 in a state where the conveyance cover 32 is removed.

As illustrated in FIGS. 2 and 3, a pair of guide regulating plates 18 is provided in the document tray 30. Each guide regulating plate 18 can slide in a width direction perpendicular to the document conveying direction (i.e., the width direction of the stacked document bundle S). Further, a guide regulating plate document width detecting sensor (not illustrated) is interlocked with the above-mentioned guide regulating plates 18 in such a way as to detect the length of the document in the width direction (i.e., a document width). When a user sets a document on the ADF 100, the user can manually adjust the clearance between the above-mentioned guide regulating plates 18 in such a way as to prevent the document from being inclined in a setting completed state where the document is firmly regulated (sandwiched) and pressed from both sides thereof in the width direction.

In a case where the document bundle S is constituted by documents having the same size, the document size of the documents stacked on the document tray 30 can be determined in the following manner. More specifically, the document size of the document bundle S can be identified based on document width information that is obtainable via the guide regulating plate document width detecting sensor and document length information (in the document conveying direction) that is detectable via a first tray size detecting sensor 10 and a second tray size detecting sensor 11 provided on the document tray 30. The first tray size detecting sensor 10 and the second tray size detecting sensor 11 may be simply referred to as "tray sensor 10" and "tray sensor 11," respectively. A reading mode (e.g., the same width/the different width mixed document reading mode) applicable to a document bundle S of a plurality of document sheets that are differentiated in size and mixed with each other will be described in detail below.

Hereinafter, a document reading method will be described in detail below.

In a case where a document is placed on a document positioning glass 202, the reader 200 optically reads image information recorded on the document, while the optical scanner unit 209 scans the document placed on the document positioning glass 202 in the right direction (i.e., a sub scanning direction) illustrated in FIG. 1.

Further, in a case where a plurality of document sheets is stacked on the document tray 30 of the ADF 100, the ADF 100 conveys each document sheet from the document tray 30 to the document reading position. On the other hand, the reader 200 causes the optical scanner unit 209 to move toward the document reading position on the document feeding-reading platen glass 201 and read the document being currently conveyed at the document reading position.

Each document set on the ADF 100 or placed on the document positioning glass 202 can be read by an optical system via the document feeding-reading platen glass 201 or the document positioning glass 202. The optical system includes a pair of mirror units 205 and 206, a lens 207, and a charge-coupled device (CCD) sensor unit 210, in addition to the optical scanner unit 209. Further, a light source lamp 203 and a mirror unit 204 are provided in the optical scanner unit 209. The image information read by the CCD sensor unit 210 can be photoelectrically converted and input as image data to the controller unit 400.

The reference white plate 219 is a white plate that can be used to create white level reference data to be used in shading correction processing. Immediately after starting a document image reading job, the reader 200 causes the optical scanner unit 209 to move until it reaches the position immediately beneath the reference white plate 219 and performs the shading correction processing by reading the reference white plate 219.

A control configuration will be described in detail below with reference to FIG. 4.

Figure 4:
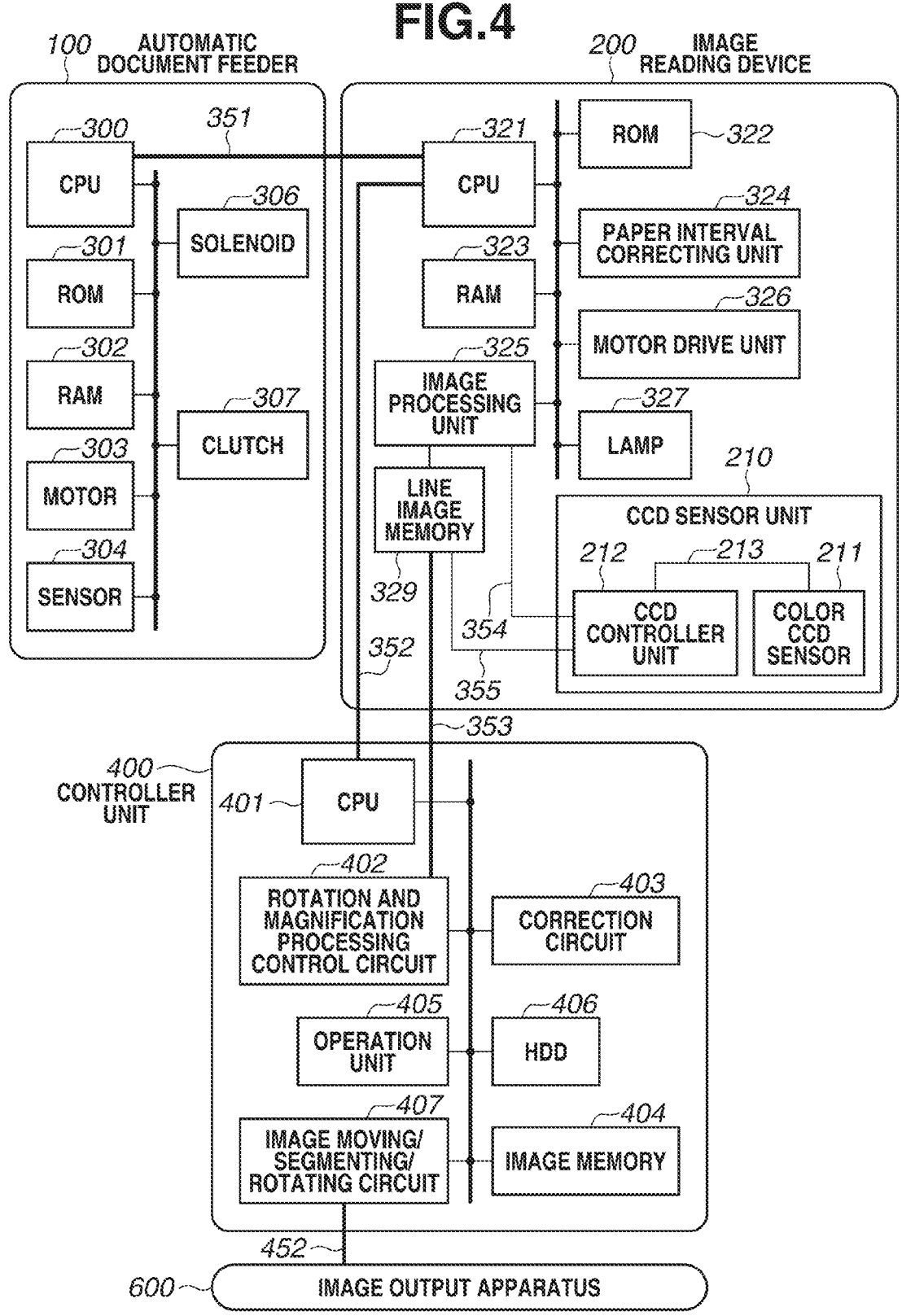
FIG. 4 illustrates configuration examples of an ADF, an image reading device, and a controller unit.

FIG. 4 is a block diagram illustrating an example of the control configuration, which includes the ADF 100, the image reading device 200, and the controller unit 400.

The ADF 100 includes a control unit (i.e., a central processing unit (CPU)) 300, a read only memory (ROM) 301, a random access memory (RAM) 302, output ports, and input ports.

The ROM 301 stores control programs for the CPU 300. On the other hand, the RAM 302 stores input data and work data. A motor 303 that can drive various conveyance rollers, a solenoid 306, and a clutch 307 are connected to the output port. Various sensors 304 are connected to the input ports. The various sensors 304 include the post-separation sensor 12, the registration sensor 13, the lead sensor 14, the paper discharge sensor 15, and a document width detecting sensor 17.

The CPU 300 can control the document conveying operation according to the control programs stored in the ROM 301, which is connected via a bus line. Further, the CPU 300 can perform a serial communication with a central processing unit (CPU) 321 provided in the image reading device (reader) 200 via a control communication line 351 to transmit and receive control data to and from the image reading device 200. Further, an image top signal, which serves as a leading reference of the document image data, can be transmitted to the image reading device 200 via the control communication line 351.

The CPU 321 provided in the image reading device 200 can control various operations to be performed by the image reading device 200. The CPU 321 is connected to a ROM 322 and a work RAM 323, each storing programs. An optical system motor drive unit 326 is a driver circuit for driving a drive motor provided in the optical system.

A lamp 327 and the CCD sensor unit 210 are connected to the image reading device 200. A color image reading CCD sensor 211 and a CCD controller unit (i.e., CCD control unit) 212 are provided in the CCD sensor unit 210. The CPU 321 can perform image reading processing by controlling the optical system motor drive unit 326 and controlling the CCD sensor unit 210 via an image processing unit 325.

To realize the document conveying operation, the CPU 321 transmits a paper conveyance control command to the paper conveyance control CPU 300 of the ADF 100 via the control communication line (i.e., the communication line) 351. In response to the paper conveyance control command, the CPU 300 monitors the various sensors 304 disposed along the conveying path and drives the conveying motor 303, the solenoid 306, and the clutch 307 in such a way as to perform a paper conveyance control. As mentioned above, the CPU 321 can control a document conveying operation to be performed by the ADF 100 and can control an image reading operation to be performed by the image reading device 200.

A document interval correction processing unit (i.e., a paper interval correcting unit) 324 can correct a conveyance interval between a preceding document and a following document (namely, the distance between preceding document and the following document). A reflected light image of the document formed on the CCD sensor unit 210 via the lens 207 can be converted into digital image data. Further, the image processing unit 325 performs various types of image processing on the converted digital image data. In this case, the image processing that can be performed by the image processing unit 325 includes the shading correction processing and unnecessary image removal processing for detecting and removing a streak image included in the image data. The image data having been subjected to the above-mentioned various types of image processing can be written into a line image memory unit 329.

The data written in the line image memory unit 329 can be sequentially transmitted to the controller unit 400 via a controller interface image communication line 353 including an image transfer clock signal line.

Further, the CPU 321 can adjust the timing of the image top signal serving as the leading reference of the document image data. The timing-adjusted signal can be transmitted to the controller unit 400 via a controller interface control communication line 352. Further, the timing of the image top signal transmitted from the ADF 100 via the communication line 351 can be similarly adjusted by the CPU 321 provided in the image reading device 200 and can be transmitted to the controller unit 400 via the controller interface control communication line 352.

The controller unit 400 includes a CPU 401, a rotation and magnification processing control circuit (i.e., an image control circuit capable of controlling magnification and rotation) 402, a correction circuit 403, an image memory 404, an operation unit 405, a hard disk drive (HDD) 406, and an image moving/segmenting/rotating circuit 407. Further, the CPU 401 can control various operations to be performed by the controller unit 400, by reading and executing programs stored in a ROM (not illustrated) provided in the CPU 401. In this case, the controller unit 400 can be configured to additionally include a ROM and a RAM. The controller unit 400 can control various operations to be performed by the image reading system (i.e., the document reading apparatus) 500 that includes the image reading device 200 and the automatic document feeder 100. The operation unit 405 enables a user to select a desired "mixed document reading mode." If the user selects the mixed document reading mode, the operation unit 405 further enables the user to select documents that are identical in width or documents that are different in width and mixed with each other.

In the image reading device 200, the CPU 321 can control the image processing unit 325 connected to a control bus line. Further, the CPU 321 can control the CCD sensor unit 210 by transmitting a control signal to the CCD sensor unit 210 via a control communication line 354 connected to the image processing unit 325.

When the CCD sensor unit 210 scans a document image, the color image reading CCD sensor 211 generates an analog image signal based on a reading result of each line and outputs the generated analog image signal to the CCD controller unit 212 via a communication line 213. The CCD controller unit 212 converts the analog image signal into digital image data. The line image memory unit 329 receives the digital image data from the CCD controller unit 212 via an image data information communication line 355 including the image transfer clock signal line, and transmits the digital image data to the controller unit 400.

After the image signal (i.e., image data) is subjected to image processing (e.g., magnification and rotation) performed by the rotation and magnification processing control circuit 402, the image signal (i.e., the image data) is transmitted to the correction circuit 403. The correction circuit 403 can perform correction processing on the image signal and write the corrected image data into the image memory 404. The image data having been subjected to the above-mentioned various types of processing can be regarded as a read image of the document. If a scan and storage function is used, the image data having been read into the image memory 404 can be stored in the HDD 406. The image moving/segmenting/rotating circuit 407 can move image data on the image memory 404 and segment the image data with a designated rectangle. Further, the image moving/segmenting/rotating circuit 407 can rotate the segmented image data and output the rotated image data to the image output apparatus 600 via a controller interface image communication line 452.

<Automatic Paper Selection Function>

The automatic paper selection function is a function of enabling the document reading apparatus 500 to automatically select a recording medium to be used in an image forming operation based on the size of a recording medium stored in a paper feeding cassette (not illustrated) of the image output apparatus 600, the size of a document, and a designated reading magnification. In this case, each user can arbitrarily set the reading magnification.

For example, in a case where a user sets an A4-size document on the ADF 100 with a landscape orientation according to which the long side of the document is positioned parallel to the conveying direction (in this case, the landscape size is referred to as "A4R") and the reading magnification set by the user is 141%, the A4R-size document is enlarged by 141% and subjected to a reading operation. In this case, the output size of the read document image becomes A3 size. Therefore, if an A3-size recording medium is stored beforehand in an image forming apparatus, the A3-size recording medium can be automatically selected and an output image can be copied on the A3-size recording medium.

As mentioned above, the automatic paper selection function is unavailable unless the document size can be determined before the reader 200 and the ADF 100 read a document image and information about the document size (i.e., the output image size) can be transmitted to the controller unit 400.

<Automatic Magnification Selection Function>

The automatic magnification selection function is usable in a case where a document bundle composed of a plurality of document sheets that are mainly different in size and mixed with each other is output by uniformly copying their images on papers having a specific size. Therefore, the document reading apparatus 500 automatically determines the reading magnification of a document in such a way that the read image fits with the size of a recording medium on which the image forming apparatus forms an image, and reads the document according to the determined magnification. The above-mentioned reading magnification can be determined based on document size information about each document of the document bundle S set on the reader 200 or the ADF 100 and size information about a recording medium selected by a user as a recording medium to be used in an image forming operation.

As mentioned above, the automatic magnification selection function is a function of automatically selecting a desired reading magnification based on the document size information and the recording medium size information.

For example, it is assumed that the size of a document to be copied is A3 and a read document image is copied on an A4-size recording medium. In this case, unless the image data of a document read by the CCD sensor unit 210 provided in the reader 200 is reduced and rotated, it is unfeasible to copy the image data on the A4-size recording medium.

Accordingly, in automatically calculating a reduction magnification, it is necessary to determine a document size before the document reading apparatus 500 reads a document. Further, it is necessary to cause the controller unit 400 to prepare for image processing, such as rotation processing (i.e., processing to be performed on read image data) before performing a document reading operation.

<Same Width/Different Width Mixed Document Reading Mode>

Next, the same width/the different width mixed document reading mode will be described in detail below.

The above-mentioned "automatic paper selection function" and the "automatic magnification selection function" can be mainly used when the "mixed document reading mode" is set to detect the document size of each document in a case where the document bundle is composed of a plurality of document sheets that are different in size and mixed with each other.

As a conventionally known technique to determine the size of each document, the document reading apparatus 500 can convey the target document along a reversing path that is usable for the reversing of the document in a two-sided reading operation, without reading any image from the target document, and can detect the document length (i.e., the length of the document in the document conveying direction) while conveying the document. Then, the document reading apparatus 500 can determine a document size based on the document length and the document width having been detected as mentioned above. Further, after determining the document size, the document reading apparatus 500 can perform a reverse conveying operation (i.e., a hollow rotation) two times by using the reversing path so that a reading target surface can reach the reading position.

Performing the hollow rotation (i.e., the surplus reversing) two times for each document to determine the document size as mentioned above lowers the reading efficiency in a case where the mixed document reading mode is set.

As a technique capable of solving the above-mentioned problem, a document size prediction control is employable. More specifically, when the document reading apparatus 500 determines the size of each document, it is useful to predict a provisional document size based on information obtainable from a conveyed document. In this case, if the provisionally determined document size is correct, the document reading apparatus 500 can continuously read the document.

On the other hand, in a case where the provisionally determined document size is different from an actual measurement result, the document reading apparatus 500 can determine that the provisionally determined document size is wrong (i.e., erroneously detected). In this case, the document reading apparatus 500 detects a correct document size while the document undergoes the hollow rotation. Even when the necessity of performing the hollow rotation arises in provisionally determining the document size because the provisionally determined document size is wrong, the document reading apparatus 500 can provisionally determine the document size so that the hollow rotation time becomes shorter, as mentioned below.

As mentioned above, it is necessary to perform the reading operation again when the document size is wrong. Therefore, the above-mentioned automatic functions (i.e., the automatic paper selection function and the automatic magnification selection function) cannot be started at the time when the document size is provisionally determined. In other words, it is necessary for the document reading apparatus 500 to complete the size determination before starting the automatic functions. Therefore, the print start timing is delayed.

Next, document size determination processing in a document reading operation, which can be performed in "the same width/the different width mixed document reading mode," will be described. The "same width mixed document reading mode" and the "different width mixed document reading mode" are collectively referred to as "mixed document reading mode."

<Information Obtained from Document being Currently Conveyed>

The conveyance guide regulating plates 18 (i.e., a pair of regulating members), which can regulate a document bundle stacked on the document tray 30 at both ends in the width direction, is provided on the document tray 30. Each conveyance guide regulating plate 18 is freely movable in the width direction as indicated by an arrow "f" in FIG. 2. The position of the conveyance guide regulating plates 18 can be detected by a first detecting unit, such as a sensor (not illustrated). Further, when a user ordinarily operates the conveyance guide regulating plates 18, the user can move each conveyance guide regulating plate 18 to the position corresponding to the width of each document bundle.

As mentioned above, the paper feeding roller 1 successively feeds documents one by one from the document bundle. The separation roller 2 separates the uppermost document from the following document in such a way as to prevent a plurality of sheets from being conveyed together in an overlapped state. The registration rollers 3 cooperatively correct the skew of a currently conveyed document (sheet) and convey the document at predetermined timing. The document presence/absence detecting sensor 16 detects the presence/absence of a document stacked on the document tray 30. The first tray size detecting sensor 10 and the second tray size detecting sensor 11 cooperatively determine the length of each document in the document conveying direction when the document is set on the document tray 30.

Ordinarily, in a case where a document bundle composed of a plurality of document sheets having the same size is set on the document tray 30, it is feasible to determine the document size based on the width of the document bundle and the length of the document bundle in the conveying direction if the document size is a regular size. More specifically, it is feasible to determine a regular document size based on the document width information detected by the conveyance guide regulating plates 18 and the document length information detected by the first tray size detecting sensor 10 and the second tray size detecting sensor 11. In a case where all documents have the same size, the document width and the document length (i.e., information detected by these sensors) are common to all documents.

On the other hand, in a case where a document bundle set on the document tray 30 includes documents that are mutually different in width or length and mixed with each other, the detectable document width depends on the width of a document having the maximum width in the document bundle. Further, the document length in the conveying direction detectable by the first tray size detecting sensor 10 and the second tray size detecting sensor 11 depends on the length of a document having the maximum length in the document conveying direction in the document bundle.

FIG. 5 illustrates tables indicating a relationship between various document sizes and corresponding ON/OFF states of the first tray size detecting sensor 10 and the second tray size detecting sensor 11. The tables illustrated in FIG. 5 can be stored in the ROM 322.

FIG. 5 illustrates a table dedicated to AB standard regular sizes (AB oriented sizes) and a table dedicated to inch standard regular sizes (inch oriented sizes). As understood from the tables illustrated in FIG. 5, the first tray size detecting sensor 10 and the second tray size detecting sensor 11 (which may be referred to as "two sensors" in the following description) are configured to take ON/OFF states according to the regulated size of each document.

For example, according to the table illustrated in FIG. 5, in a case where a document bundle includes an A3 document as a first sheet and a B4 document as a second sheet, the first tray size detecting sensor 10 and the second tray size detecting sensor 11 take the ON state at the start timing of a paper feeding operation in any of the first sheet (i.e., the A3 document) and the second sheet (i.e., the B4 document).

Therefore, immediately after the paper feeding operation of the first document starts, the document length can be provisionally determined as belonging to the large size series (i.e., A3/B4 not A4/B5) based on information detected by two sensors. Subsequently, the size of the presently conveyed document (i.e., the A3 document) can be actually measured. Thus, the document length can be finally determined as belonging to the large size series.

Further, the second document follows the first document. Immediately after the paper feeding operation of the second document starts, the document length can be provisionally determined as belonging to the large size series based on information detected by two sensors. Subsequently, similar to the first sheet, the size of the presently conveyed document (i.e., the B4 document) can be actually measured, and determined as belonging to the large size series.

As mentioned above, even in a case where different document sizes are combined, there is the possibility that the states of two sensors at the start timing of the paper feeding and conveying operation are directly applicable to the length of document being currently conveyed, depending on each combination pattern or the order of combined documents. More specifically, the A3/B4 combination is determined as belonging to the large size series in the provisional determination based on the above-mentioned two sensors and is also determined as belonging to the large size series in the actual measurement.

Therefore, the combination of two documents according to which correct information about the document length is obtainable at the start timing of the paper feeding and conveying operation is hereinafter considered. More specifically, the above-mentioned combination of the A3 document (as the first sheet) and the B4 document (as the second sheet) will be taken into consideration with respect to the above-mentioned document length.

The following things will be considered in a case where correct document widths, namely, A3 width (297 mm) of the first document and B4 width (257 mm) of the second document, can be detected before the leading edge of each document reaches the document reading position. More specifically, a provisional document size is determined based on the document length information detected at the start timing of the paper feeding and conveying operation and the correct document width information. Further, a predictable result is that the document size actually measured through concurrent processing immediately after the reading operation is started becomes equal to the provisionally determined document size.

According to the above-mentioned combination, the hollow rotation to reread the document is unnecessary because it is predicted that the provisionally determined document size will be finally equal to the correct document size. In this case, a document image reading operation is performed based on the provisional size because the leading edge of the document reaches the reading position before the document size is determined.

Further, for example, according to the table illustrated in FIG. 5, in a case where a document bundle includes a first sheet of A4 size and a second sheet of B5 size, the first tray size detecting sensor 10 and the second tray size detecting sensor 11 take the OFF state (i.e., the same detecting state). In this case, the document length can be determined as belonging to the small size series.

Accordingly, when the width size of each document during a conveying operation is detected as A4 width (297 mm) or B5 width (257 mm) before the leading edge of the document reaches the document reading position, the document size is provisionally determined at the width size detection timing. Then, a predictable result is that the above-mentioned provisionally determined size is equal to the document size actually measured through the concurrent processing immediately after the reading operation is started.

Accordingly, in the case of A4/B5 combination, similar to the above-mentioned A3/B4 combination, it can be predicted that the document size provisionally determined before the leading edge of the document reaches the document reading position will be finally equal to the correct document size. Therefore, according to the above-mentioned combination, the hollow rotation to reread the document is unnecessary. In this case, a document image reading operation is performed based on the provisional size because the leading edge of the document reaches the reading position before the document size is determined.

Next, it is assumed that a document bundle includes the first document of A4 size and the second document of B4 size.

In the case of the document bundle including the first document of A4 size and the second document of B4 size, the longer document length is B4 size if two documents (i.e., the A4-size sheet and the B4-size sheet) are compared. Therefore, both of the first tray size detecting sensor 10 and the second tray size detecting sensor 11 disposed on the document tray 30 turn into the ON state according to the length of B4 size.

Therefore, according to the table illustrated in FIG. 5, the first sheet (i.e., the A4-size document) is predicted as belonging to the large size series (A3 or B4). As a result, in the case of the above-mentioned combination of the A4 document and the B4 document, even if the correct document width can be provisionally identified during a document conveying operation, the following provisional document size will be obtained. More specifically, the first document size will be provisionally determined as A3 size if the document size is predicted based on the width information thereof and the document length information detectable by the first tray size detecting sensor 10 and the second tray size detecting sensor 11. Accordingly, the predicted provisional document size is different from the actually measured document size.

In a case where the provisional document size (A3) provisionally determined based on the prediction is different from the correct document size (A4) obtained by the actual measurement as mentioned above, the above-mentioned method requires two hollow rotations of the document to be performed along the reversing path.

Figure 6:
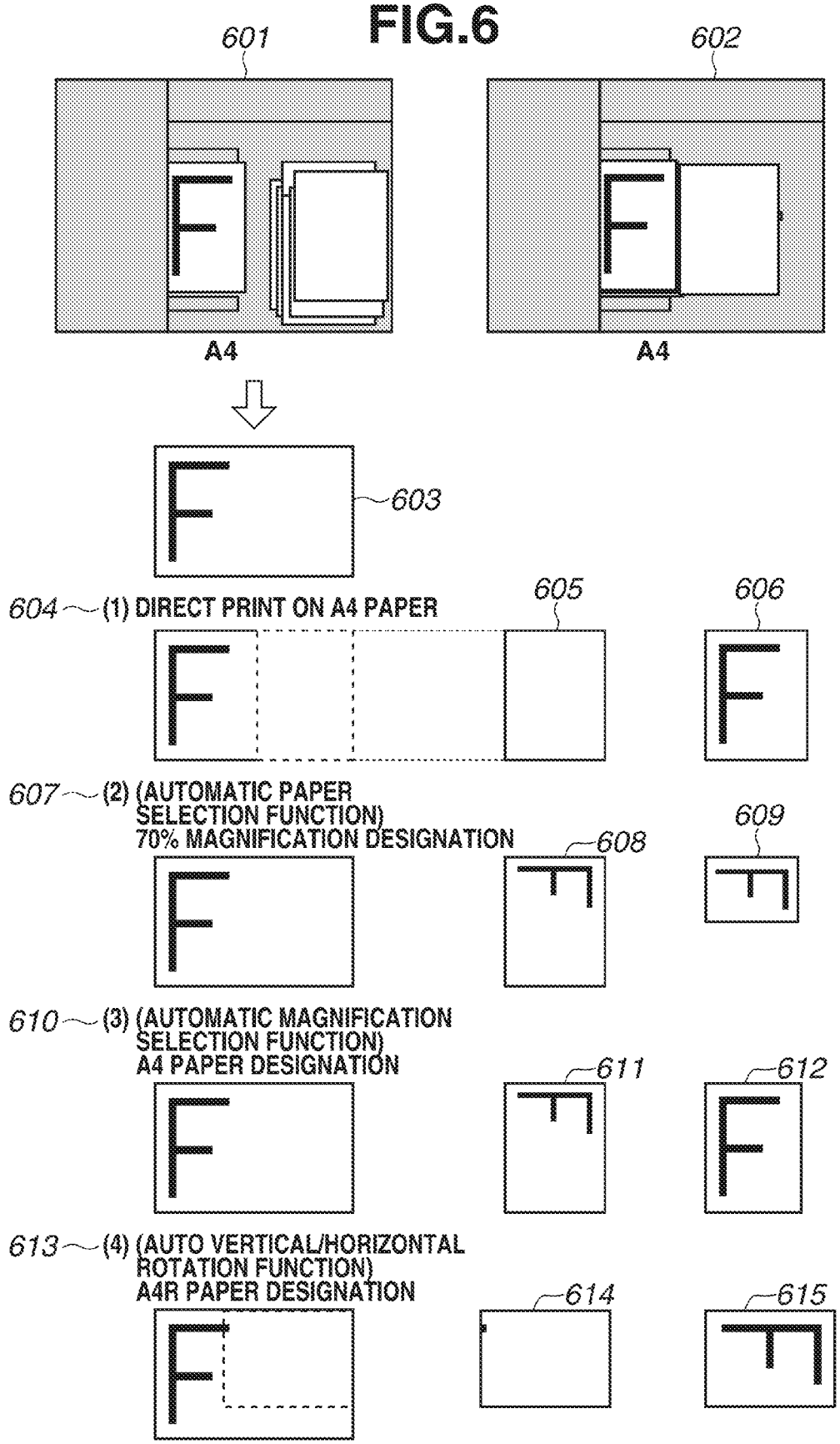
FIG. 6 illustrates output images obtainable when a document size is erroneously detected.

FIG. 6 illustrates output images obtainable when the document size is erroneously detected.

In a case where a user does not designate any mixed document mode, if something is placed on both the first tray size detecting sensor 10 and the second tray size detecting sensor 11 in a state where an A4 document is set on the ADF, the A4 document may be erroneously detected as an A3 size document (see 601).

Further, as mentioned above, when a large paper is detected by both the first tray size detecting sensor 10 and the second tray size detecting sensor 11 in the case of mixed document sizes, erroneous detection will occur similarly (see 602).

The document reading apparatus 500 according to the present exemplary embodiment sequentially conveys and reads documents stacked on the document tray 30 and converts the read document into image data having the size detected by the above-mentioned sensors provided on the document tray 30. Therefore, in this case, the document reading apparatus 500 detects the A3 document and develops image data in an A3 size memory.

According to the above-mentioned example, as a result of the erroneous detection of the A3 document (not the A4 document), the A4-size document is developed on the leading side on the A3-size memory and an A4-size blank image is developed on the trailing side on the A3-size memory (see 603).

In a case where a user does not designate any mixed document mode, the image processing apparatus 1000 starts preparation for the latter processing (i.e., the processing to be performed after the image reading device 200 completes the reading operation of image data) according to the document size detection result (including an erroneous detection result) obtainable from the sensors 10 and 11. For example, the image processing apparatus 1000 performs settings relating to magnification, rotation, reading position, and clipping rectangle according to the document size detection result for the rotation and magnification processing control circuit 402 and the image moving/segmenting/rotating circuit 407. Further, the image processing apparatus 1000 outputs a paper feeding instruction designating a paper (sheet) selected according to the document size detection result to the image output apparatus 600. In the above-mentioned cases 601 and 602, the image processing apparatus 1000 starts preparing for the latter processing while regarding the document size as A3.

(1) First, it is assumed that the read image data (see 603) is copied on an A4 paper (see 604). In this case, the image processing apparatus 1000 prepares beforehand for the latter processing in such a way as to print an A4-size blank rectangular portion from the upper right of an A3 document according to the erroneously detected document size, if the origin is set on the upper right of the document. Accordingly, the image output apparatus 600 outputs an image 605. However, in this case, the output expected by the user is an image 606 because the user wants to copy an A4 document on an A4 paper. If the origin is set on the upper left of the document, the image output apparatus 600 can be expected to output the image 606. However, in the case of the back surface of the document whose orientation is set to upward-downward opening, a blank image similar to the image 605 will be output. Thus, the output image becomes far from the user's expectation.

(2) Next, it is assumed that the automatic paper selection function is valid and the designated magnification is 70% (see 607). In this case, to magnify an A3 document by 70%, the image processing apparatus 1000 prepares beforehand for the latter processing in such a way as to select an A4 paper according to the erroneously detected document size, magnify the document image by 70%, rotate the magnified image by 90 degrees, and output the rotated image on the A4 paper. Accordingly, the image output apparatus 600 outputs an image 608. However, in this case, the output expected by the user is an image 609 printed on an A5 paper because the user wants to magnify the A4 document by 70%.

(3) Next, it is presumed that the automatic magnification selection function is valid and the designated paper size is A4 (see 610). In this case, to copy an A3 document on an A4 paper, the image processing apparatus 1000 prepares beforehand for the latter processing in such a way as to magnify the document image by 70% according to the erroneously detected document size, rotate the magnified image by 90 degrees, and output the rotated image on the A4 paper. Accordingly, the image output apparatus 600 outputs an image 611. However, in this case, the output expected by the user is an image 612 because the user wants to copy the A4 document on the A4 paper without any magnification or any rotation.

(4) Next, it is presumed that an auto vertical/horizontal rotation function is valid (see 613). When the "auto vertical/horizontal rotation" function is valid, the image processing apparatus 1000 automatically performs rotation processing in a case where a user apparently expects a rotation of the image. For example, the image processing apparatus 1000 automatically rotates the image in a case where an A4 document is copied on an A4R paper. Further, the image processing apparatus 1000 does not rotate the image in a case where an A3 document is copied on an A4 or A4R paper.

In this case, the image processing apparatus 1000 prepares beforehand for the latter processing in such a way as to print an image corresponding to the A4R paper from the upper right of the A3 document to output the A3 document on the A4R paper according to the erroneously detected document size. Accordingly, the image output apparatus 600 outputs an image 614. However, in this case, the user expects that an image 615 is copied on the A4R paper after the A4 document is rotated.

FIG. 7 illustrates various methods for outputting an image after correcting the latter processing in response to the error in the document size detection illustrated in FIG. 6.

First, an operation performed when the document scan and storage function is valid will be described in detail below.

When the scan and storage function is selected, the image processing apparatus 1000 can store scanned document image in the HDD 406 without printing any image (see 701). In this case, the image moving/segmenting/rotating circuit 407 clips a blank space (i.e., a portion other than the document image) from A3 image data on the image memory 404 in such a way as to leave an area 702 corresponding to an actual A4 document (see 717) and stores the remaining area 702 as an A4 image in the HDD 406. Therefore, the image processing apparatus 1000 can prevent the miss operation even when the user does not explicitly designate any mixed document mode.

Next, a document copy operation will be described in detail below.

(1) First, it is assumed that a user wants to directly copy a document on an A4 paper (see 703). For example, if the origin is set on the upper right of the document, the image processing apparatus 1000 prepares beforehand for the latter processing in such a way as to set the center of the document image as an image output start position before starting scan processing and output a scanned image to the image output apparatus 600, to copy (print) an A4-size blank rectangular portion from the upper right of an A3 document image. More specifically, when the image processing apparatus 1000 reads the image data obtained by the image reading device 200 and stored in the image memory 404 and outputs the read image to the image output apparatus 600, the output start position having been set beforehand by the image processing apparatus 1000 is a position corresponding to the center of the document image. Accordingly, to obtain a correction result reflecting the user's expecting output, the image processing apparatus 1000 corrects the prepared processing in such a way as to move the image output start position to the left edge of the document image according to the determined document size (see 704). For example, the image processing apparatus 1000 corrects the settings of the image moving/segmenting/rotating circuit 407. Thus, the image processing apparatus 1000 can read the image data from the image memory 404 according to the corrected settings and can output the read image data to the image output apparatus 600. The image output apparatus 600 prints the image on the A4 paper (see 705).

(2) Next, it is assumed that the automatic paper selection function is valid and the designated magnification is 70% (see 706). In this case, the feeding of an A4 paper is already completed to magnify an A3 document by 70%. Therefore, it is unfeasible to print a user's expecting image on an A5 paper through the prepared processing. In this case, correcting the document origin position (i.e., the image output start position) is feasible. Accordingly, to obtain a correction result reflecting the user's expecting output, the image processing apparatus 1000 moves the image output start position to the left edge of the document image according to the determined document size (see 707). Further, the image processing apparatus 1000 corrects the prepared processing in such a way as to add a blank image corresponding to the A4 size to the leading edge and output an image rotated by 90 degrees. For example, the image processing apparatus 1000 corrects the settings of the image moving/segmenting/rotating circuit 407. Thus, the image processing apparatus 1000 can read the image data from the image memory 404 according to the corrected settings and output the image data subjected to image processing to the image output apparatus 600. The image output apparatus 600 prints the image on the A4 paper (see 708).

(3) Next, it is assumed that the automatic magnification selection function is valid and the designated paper size is A4 (see 709). In this case, to copy an A3 document on an A4 paper, the image processing apparatus 1000 prepares beforehand for the latter processing in such a way as to magnify the document image by 70% and rotate the magnified document image by 90 degrees and further output the rotated document image on the A4 paper. Accordingly, in this case, the image processing apparatus 1000 performs the following correction processing according to the determined document size to obtain a correction result reflecting the user's expecting output. The image processing apparatus 1000 corrects the prepared processing in such a way as to move the image output start position to the left edge of the document image (see 710), cancel the designated magnification and the designated rotation (see 715), and output the image data to the image output apparatus 600 so that the image can be printed on the A4 paper. For example, the image processing apparatus 1000 corrects the settings of the rotation and magnification processing control circuit 402 and the image moving/segmenting/rotating circuit 407. Thus, the image processing apparatus 1000 can read the image data from the image memory 404 according to the corrected settings and output the image data subjected to image processing to the image output apparatus 600. The image output apparatus 600 prints the image on the A4 paper (see 711).

However, in a case where the image data stored in the image memory 404 is already subjected to the magnification and rotation processing, the image processing apparatus 1000 sets correction processing in such a way as to nullify the executed magnification and rotation processing instead of cancelling or changing the magnification and rotation settings. For example, the image processing apparatus 1000 sets correction processing that can substantially cancel the executed processing. For example, in a case where the image data stored in the image memory 404 is already 70% magnified by the rotation and magnification processing control circuit 402, the image processing apparatus 1000 causes the rotation and magnification processing control circuit 402 to perform 141% magnification to bring effect of cancelling the executed magnification (70%). Further, in a case where the image data stored in the image memory 404 is already 90° rotated by the rotation and magnification processing control circuit 402, the image processing apparatus 1000 causes the image moving/segmenting/rotating circuit 407 to perform −90 degrees rotation to bring effect of cancelling the executed rotation.

(4) Next, it is assumed that the auto vertical/horizontal rotation function is valid (see 712). In this case, to output an A3 document on an A4R paper, the image processing apparatus 1000 prepares for the processing for copying an image corresponding to the A4R paper from the upper right of the A3 document. Accordingly, in this case, to obtain a correction result reflecting the user's expecting output, the image processing apparatus 1000 corrects the processing in the following manner according to the determined document size. More specifically, the image processing apparatus 1000 corrects the prepared processing in such a way as to move the image output start position to the left edge of the document image (see 713), switch a document clipping area from a horizontal rectangle to a vertical rectangle (see 718), change the rotation designation to 90 degrees (see 716), and print an image 714 on the A4R paper. For example, the image processing apparatus 1000 corrects the settings of the image moving/segmenting/rotating circuit 407. Thus, the image processing apparatus 1000 can read the image data from the image memory 404 according to the corrected settings and output the image data subjected to image processing to the image output apparatus 600. The image output apparatus 600 prints the image on the A4 paper (see 714).

As mentioned above, the image processing apparatus 1000 can output a user's expecting image, even when the document size is erroneously detected, by performing the correction processing in response to the erroneous detection of the document size.

Hereinafter, an image processing operation that can be performed by the image processing apparatus 1000 according to the present exemplary embodiment will be described in detail below with reference to FIGS. 8 and 9.

Figure 8:
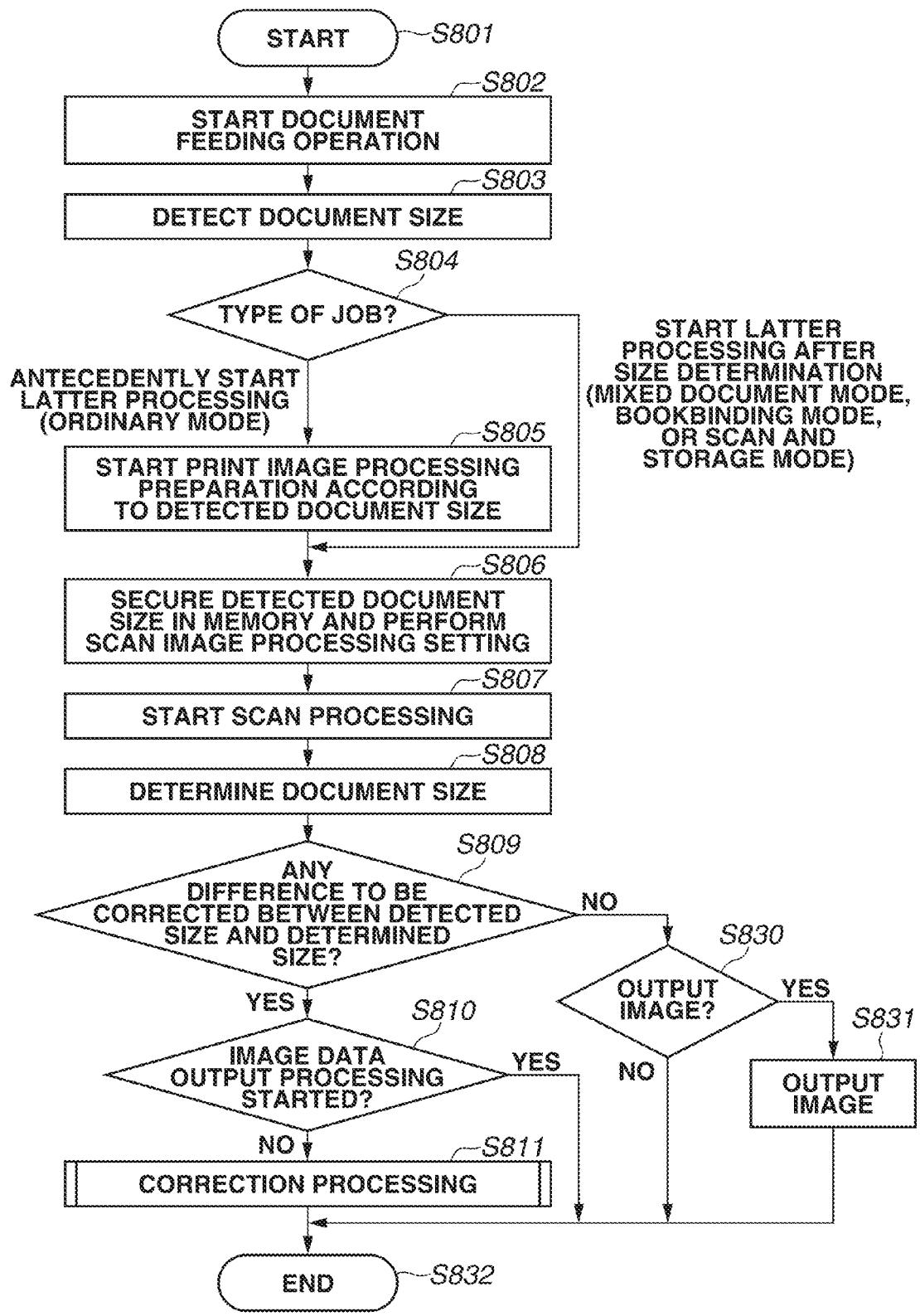
FIG. 8 is a flowchart illustrating an example of an image processing operation performed by the image processing apparatus according to the present exemplary embodiment.

FIG. 8 is a flowchart illustrating an example of the image processing operation that can be performed by the image processing apparatus 1000 according to the present exemplary embodiment.

Figure 9:
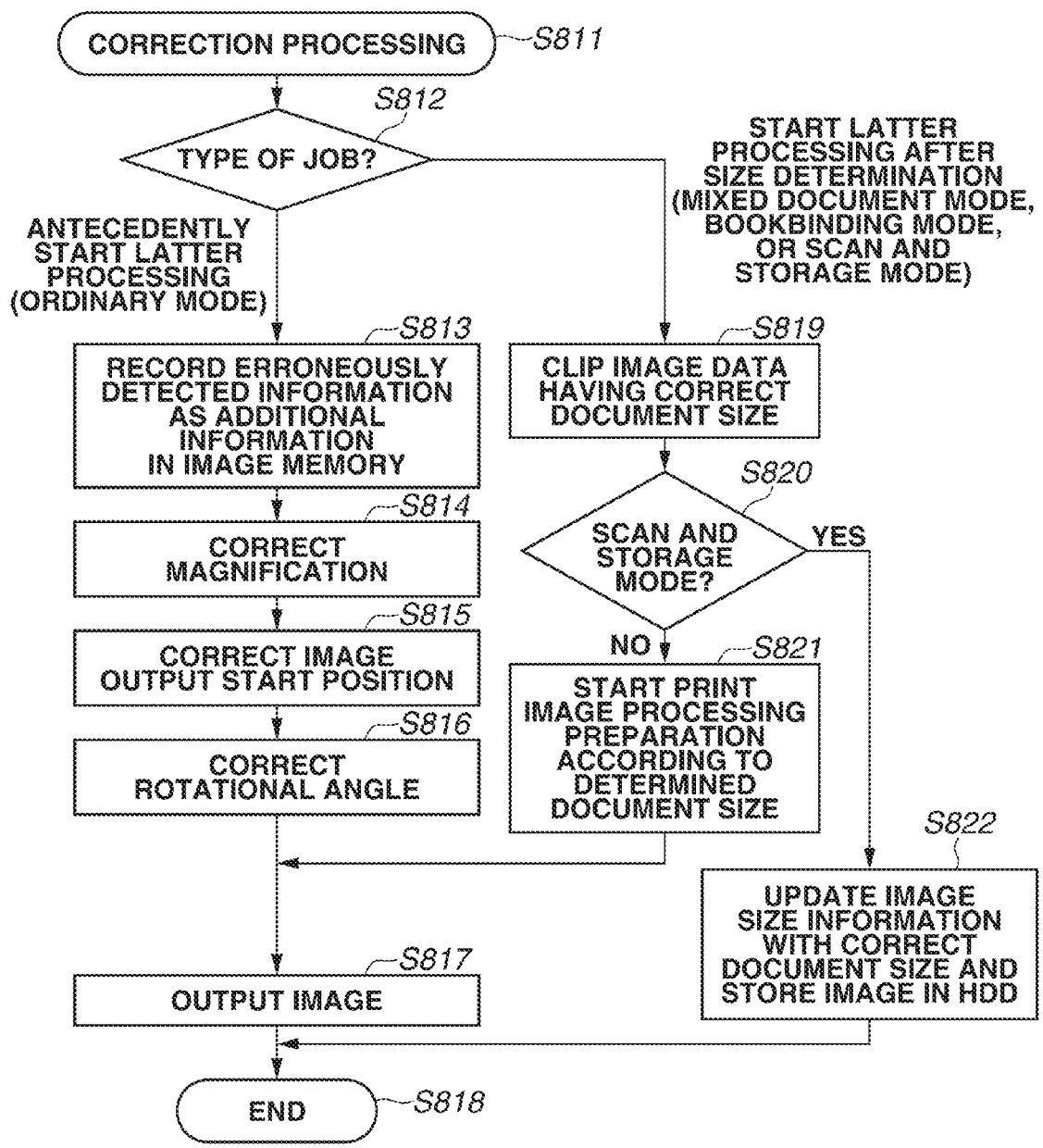
FIG. 9 is a flowchart illustrating an example of correction processing performed in response to an error in document size detection.

FIG. 9 is a flowchart illustrating an example of the correction processing to be performed in response to erroneous detection of the document size.

To realize the processing of the above-mentioned flowcharts, the CPU 401 of the controller unit 400 reads a program stored in a ROM (not illustrated) of the CPU 401 and executes the program.

In step S801, the controller unit 400 starts the processing of the flowchart illustrated in FIG. 8 in response to a document reading start instruction.

Then, in step S802, the controller unit 400 instructs the image reading device 200 to start a document feeding operation. Next, in step S803, the controller unit 400 receives information about a detected document size from the image reading device 200. Then, the operation proceeds to step S804. The detected document size obtained in the step S803 is based on the actual detection by the sensors provided on the document tray 30.

In step S804, the controller unit 400 confirms whether the type of a currently executed job is an ordinary mode for causing the image processing apparatus 1000 to antecedently start the latter processing according to the document size detection result obtained in the step S803, before determining the document size.

Then, if the controller unit 400 determines that the job type is the ordinary mode for causing the image processing apparatus 1000 to antecedently start the latter processing ("ANTECEDENTLY START LATTER PROCESSING (ORDINARY MODE)" in step S804), the operation proceeds to step S805.

In step S805, the controller unit 400 starts the latter processing (e.g., print image processing preparation) according to the document size detection result obtained in the step S803. In this case, for example, the controller unit 400 performs settings relating to magnification, rotation, reading position, and clipping rectangle according to the detected document size for the rotation and magnification processing control circuit 402 and the image moving/segmenting/rotating circuit 407. Further, the controller unit 400 starts processing for instructing the image output apparatus 600 to feed a paper (sheet) determined according to the detected document size. Then, the operation proceeds to step S806.

On the other hand, if the controller unit 400 determines in step S804 that the job type is not the above-mentioned ordinary mode for causing the image processing apparatus 1000 to antecedently start the latter processing preparation ("START LATTER PROCESSING AFTER SIZE DETERMINATION" in step S804), the operation directly proceeds to step S806. More specifically, when the job type is a mode for causing the image processing apparatus 1000 to start the latter processing after the document size determination, according to the determined document size (e.g., "MIXED DOCUMENT MODE, BOOKBINDING MODE, OR SCAN AND STORAGE MODE" in step S804), the controller unit 400 does not antecedently start the latter processing. The operation proceeds to step S806.

In step S806, the controller unit 400 secures the detected document size (i.e., the document size received in the step S803) in the memory and performs scan image processing setting. Next, in step S807, the controller unit 400 instructs the image reading device 200 to read the document (i.e., start scan processing).

Further, if the document size is determined through the scanning performed by the image reading device 200, then in step S808, the controller unit 400 receives the determined document size from the image reading device 200.

Next, in step S809, the controller unit 400 compares the determined document size with the detected document size to determine whether there is any difference to be corrected between the detected document size and the determined document size.

Then, if it is determined that there is not any difference to be corrected (No in step S809), then in step S830, the controller unit 400 determines whether to output an image. If it is determined to output the image (Yes in step S830), then in step S831, the controller unit 400 causes the image output apparatus 600 to output the image. In step S832, the controller unit 400 terminates the processing of the flowchart illustrated in FIG. 8.

On the other hand, if the controller unit 400 determines in step S809 that there is a difference to be corrected (Yes in step S809), the operation proceeds to step S810.

In step S810, the controller unit 400 determines whether the processing for outputting image data to the image output apparatus 600 or to the HDD 406 has been started.

Then, if it is determined in step S810 that the image data output processing has not yet been started (No in step S810), then in step S811, the controller unit 400 performs correction processing (as described in detail below with reference to FIG. 9).

On the other hand, if it is determined that the image data output processing has been started (Yes in step S810), then in step S832, the controller unit 400 terminates the processing of the flowchart illustrated in FIG. 8 without performing the correction processing (in step S811).

Hereinafter, the correction processing (see step S811) will be described in detail below with reference to FIG. 9.

First, in step S812, the controller unit 400 confirms whether the type of the currently executed job is the above-mentioned ordinary mode for causing the image processing apparatus 1000 to antecedently start the latter processing.

Then, if the controller unit 400 determines that the job type is the above-mentioned ordinary mode for causing the image processing apparatus 1000 to antecedently start the latter processing ("ANTECEDENTLY START LATTER PROCESSING (ORDINARY MODE)" in step S812), the operation proceeds to step S813.

In step S813, the controller unit 400 records erroneously detected information as additional information in the image memory 404. Then, in steps S814 to S816, the controller unit 400 corrects the latter processing (i.e., the print image processing preparation) having been antecedently started in the step S805. For example, the controller unit 400 corrects the settings relating to magnification, rotation, reading position, and clipping rectangle being previously set for the rotation and magnification processing control circuit 402 and the image moving/segmenting/rotating circuit 407 according to the detected document size.

In step S814, the controller unit 400 causes the rotation and magnification processing control circuit 402 to correct the magnification, if necessary. For example, as mentioned with reference to FIG. 7 (see 715), the controller unit 400 corrects the magnification being set for the rotation and magnification processing control circuit 402.

In step S815, the controller unit 400 causes the image moving/segmenting/rotating circuit 407 to correct the image output start position, if necessary. For example, as mentioned with reference to FIG. 7 (see 704, 707, 710, and 713), the controller unit 400 corrects the image output start position being set for the image moving/segmenting/rotating circuit 407.

In step S816, the controller unit 400 causes the image moving/segmenting/rotating circuit 407 to correct the rotational angle, if necessary. For example, as mentioned with reference to FIG. 7 (see 716), the controller unit 400 corrects the rotational angle being set for the image moving/segmenting/rotating circuit 407.

After completing the corrections in steps S814 to S816, the controller unit 400 reads image data from the image memory 404 according to the corrected settings and performs image processing on the read image data, and then outputs the processed image data to the image output apparatus 600. Then, in step S818, the controller unit 400 terminates the correction processing of the flowchart illustrated in FIG. 9. Accordingly, the rotation and magnification processing control circuit 402 and the image moving/segmenting/rotating circuit 407 perform, on the image data, the processing corrected through the steps S814 to S816. Then, the processed image data is output to the image output apparatus 600.

On the other hand, if the controller unit 400 determines in step S812 that the job type is not the above-mentioned ordinary mode for causing the image processing apparatus 1000 to antecedently start the latter processing ("START LATTER PROCESSING AFTER SIZE DETERMINATION" in step S812), the operation proceeds to step S819. More specifically, in a case where the job type is the mode for causing the image processing apparatus 1000 to start the latter processing after the document size determination, according to the determined document size (e.g., "MIXED DOCUMENT MODE, BOOKBINDING MODE, OR SCAN AND STORAGE MODE" in step S812), the controller unit 400 does not perform the corrections in the steps S814 to S816 because the latter processing is not started antecedently.

In step S819, the controller unit 400 causes the image moving/segmenting/rotating circuit 407 to clip image data on the image memory 404 in such a way that the clipped image data would have a correct document size according to the document size determined in the step S808. For example, as mentioned with reference to FIG. 7 (see 717), the controller unit 400 causes the image moving/segmenting/rotating circuit 407 to clip an area different from the area corresponding to the document from the image data according to the determined document size.

Next, in step S820, the controller unit 400 determines whether the type of the job is the scan and storage mode.

Then, if the controller unit 400 determines that the job type is the scan and storage mode (Yes in step S820), the operation proceeds to step S822. In step S822, the controller unit 400 updates the image size information with the correct document size and stores the image in the HDD 406. Accordingly, the image data 702 illustrated in FIG. 7 can be stored in the HDD 406. Then, in step S818, the controller unit 400 terminates the correction processing of the flowchart illustrated in FIG. 9.

On the other hand, if the controller unit 400 determines in step S820 that the job type is not the scan and storage mode (No in step S820), the operation proceeds to step S821. In step S821, the controller unit 400 starts print image processing preparation according to the document size determined in the step S808. Then, the controller unit 400 causes the rotation and magnification processing control circuit 402 and the image moving/segmenting/rotating circuit 407 to process the image data stored in the image memory 404. Then, in step S817, the controller unit 400 outputs the processed image data to the image output apparatus 600. Further, in step S818, the controller unit 400 terminates the correction processing of the flowchart illustrated in FIG. 9. Therefore, the image data can be subjected to the processing prepared in the step S821 and output to the image output apparatus 600.

As mentioned above, when the size detecting sensors of the ADF fail in document size detection or when the documents to be conveyed are mutually different in width, the image processing apparatus can prevent the occurrence of miscopy without stopping the document reading operation or without deteriorating the performance, even in a case where the mixed document reading mode is not designated.

According to an exemplary embodiment of the present invention, even in an operation for reading a plurality of document sheets that are mutually different in size without designating any mixed document reading mode, the image processing apparatus can perform an image output operation according to the correct document size without stopping the document reading operation or without deteriorating the performance. More specifically, even in a case where a document size detection error occurs in the mode for causing the image processing apparatus to start the latter processing antecedently according to the document size detected on the document tray before determining the document size, the image processing apparatus can prevent the reading efficiency from deteriorating due to the interruption of the processing or the hollow reversing processing and further can prevent an image from being output in a way that is not expected by a user.

Accordingly, in a case where the image processing apparatus antecedently starts the latter processing according to the provisional document size before determining the document size, the image processing apparatus can prevent an image from being output according to the erroneous document size, even in a case where the provisional document size is different from the determined document size.

The configurations and contents of various data are not limited to the above-mentioned examples and are variable depending on applications or purposes.

Although the present invention has been described with reference to one exemplary embodiment, the present invention can be embodied as, for example, a system, an apparatus, a method, a program, or a storage medium. More specifically, the present invention can be applied to a system composed of a plurality of devices or can be applied to an apparatus constituted by a single device.

Further, the present invention encompasses any combination of the above exemplary embodiments.

The present invention can be realized through processing including supplying a program capable of realizing at least one of the functions described in the above-mentioned exemplary embodiments to a system or an apparatus via a network or an appropriate storage medium and causing at least one processor of a computer provided in the system or the apparatus to read and execute the program. Further, the present invention encompasses a circuit (e.g., application specific integrated circuit (ASIC)) that can realize at least one function.

The present invention is not limited to the above-mentioned exemplary embodiments and can be modified in various ways (including any possible combination of the exemplary embodiments) according to the scope of the present invention. The present invention does not exclude such modifications. More specifically, the present invention includes not only each of the above-mentioned exemplary embodiments but also any combination of the exemplary embodiments and the modified examples thereof.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-140136, filed Jul. 8, 2014, which is hereby incorporated by reference herein in its entirety.

What is claimed is:

1. An image processing apparatus comprising:
a first detector configured to detect a size of a document set on a document stacking portion;
an automatic document feeder configured to convey the document set on the document stacking portion;
a second detector configured to detect a size of the document being conveyed by the automatic document feeder;
a scanner configured to read an image of the document being conveyed by the automatic document feeder and generate image data;
a setting unit configured to set a first setting value based on the size detected by the first detector before the image of the document is read by the scanner, wherein the setting unit sets a second setting value based on the size detected by the second detector;
an executing unit configured to execute image processing on the generated image data based on the set first setting value;
an image memory configured to store the image data on which the image processing has been executed by the executing unit;
a printer; and
a controller configured to control to read the image data stored in the image memory and transfer the read image data to the printer,
wherein, in a case where the size detected by the second detector does not match the size detected by the first detector and transfer of the image data by the controller has not yet been started, the controller controls the executing unit to execute image processing on the stored image data based on the set second setting value,
wherein, in a case where the size detected by the second detector matches the size detected by the first detector, image processing on the stored image data based on the second setting value is not executed,
wherein, in a case where the size detected by the second detector does not match the size detected by the first detector and transfer of the image data by the controller has been started, image processing on the stored image data based on the second setting value is not executed, and
wherein the setting unit and the executing unit are implemented by at least one processor.

2. The image processing apparatus according to claim 1, further comprising a user interface configured to receive, from a user, an instruction indicating that a plurality of document sheets, which are mutually different in size, are set on the document stacking portion,
wherein, in a case where the instruction has not been received by the user interface, the setting unit sets the first setting value based on the size detected by the first detector before the image of the document is read by the scanner, and
wherein, in a case where the instruction has been received by the user interface, the setting unit sets the second setting value based on the size detected by the second detector after the image of the document has been read by the scanner.

3. The image processing apparatus according to claim 1, wherein the executing unit corrects the image data by extracting the stored image data based on the size detected by the second detector.

4. The image processing apparatus according to claim 1, wherein the executing unit executes magnification processing on the image data generated by the scanner based on the set first setting value, and
wherein the executing unit corrects the image data by magnifying the stored image data based on the set second setting value.

5. The image processing apparatus according to claim 1, wherein the executing unit executes rotation processing on the image data generated by the scanner based on the set first setting value, and
wherein the executing unit corrects the image data by rotating the stored image data based on the set second setting value.

6. The image processing apparatus according to claim 1, wherein the setting unit sets the first setting value based on the size detected by the first detector before the document set on the document stacking portion is conveyed by the automatic document feeder.

7. A method for controlling an image processing apparatus, the method comprising:
detecting, via a first detecting, a size of a document set on a document stacking portion;
conveying the document set on the document stacking portion;
detecting, via a second detecting, a size of the document being conveyed;
reading, by a scanner, an image of the document being conveyed and generating image data;
setting a first setting value based on the size detected by the first detecting before the image of the document is read by the scanner, wherein setting includes setting a second setting value based on the size detected by the second detecting;
executing image processing on the generated image data based on the set first setting value;
storing, in an image memory, the image data on which the image processing has been executed; and
controlling to read the image data stored in the image memory and transfer the read image data to a printer,
wherein, in a case where the size detected by the second detecting does not match the size detected by the first detecting and transfer of the image data has not yet been started, controlling includes controlling to execute image processing on the stored image data based on the set second setting value,
wherein, in a case where the size detected by the second detecting matches the size detected by the first detecting, image processing on the stored image data based on the second setting value is not executed, and
wherein, in a case where the size detected by the second detecting does not match the size detected by the first detecting and transfer of the image data has been started, image processing on the stored image data based on the second setting value is not executed.

8. A non-transitory computer-readable storage medium storing a computer program to perform a method for controlling an image processing apparatus, the method comprising:
detecting, via a first detecting, a size of a document set on a document stacking portion;
conveying the document set on the document stacking portion;

detecting, via a second detecting, a size of the document being conveyed;

reading, by a scanner, an image of the document being conveyed and generating image data;

setting a first setting value based on the size detected by the first detecting before the image of the document is read by the scanner, wherein setting includes setting a second setting value based on the size detected by the second detecting;

executing image processing on the generated image data based on the set first setting value;

storing, in an image memory, the image data on which the image processing has been executed; and controlling to read the image data stored in the image memory and transfer the read image data to a printer, wherein, in a case where the size detected by the second detecting does not match the size detected by the first detecting and transfer of the image data has not yet been started, controlling includes controlling to execute image processing on the stored image data based on the set second setting value, wherein, in a case where the size detected by the second detecting matches the size detected by the first detecting, image processing on the stored image data based on the second setting value is not executed, and wherein, in a case where the size detected by the second detecting does not match the size detected by the first detecting and transfer of the image data has been started, image processing on the stored image data based on the second setting value is not executed.

* * * * *